(12) United States Patent
Widmer

(10) Patent No.: US 7,086,425 B2
(45) Date of Patent: Aug. 8, 2006

(54) DEVICE FOR ORIENTING SPRINGS

(75) Inventor: Urs Widmer, Arbon (CH)

(73) Assignee: Spuhl AG St. Gallen, Wittenbach (CH)

( * ) Notice: Subject to any disclaimer, the term of this patent is extended or adjusted under 35 U.S.C. 154(b) by 0 days.

(21) Appl. No.: 10/522,245

(22) PCT Filed: Jun. 30, 2003

(86) PCT No.: PCT/CH03/00428

§ 371 (c)(1),
(2), (4) Date: Jan. 25, 2005

(87) PCT Pub. No.: WO2004/011173

PCT Pub. Date: Feb. 5, 2004

(65) Prior Publication Data

US 2005/0241720 A1    Nov. 3, 2005

(30) Foreign Application Priority Data

Jul. 26, 2002  (CH) .......................... 2002 1315/02

(51) Int. Cl.
*B21F 27/16* (2006.01)
(52) U.S. Cl. .................. 140/3 CA; 140/101; 198/379
(58) Field of Classification Search ............ 140/3 CA, 140/101; 198/379; 414/757
See application file for complete search history.

(56) References Cited

U.S. PATENT DOCUMENTS

| 2,504,792 | A | * | 4/1950 | Barsanti ..................... 140/101 |
| 2,716,308 | A | * | 8/1955 | Hodges, Jr. .................. 227/21 |
| 3,774,652 | A |   | 11/1973 | Sturm ........................... 140/3 |
| 4,042,122 | A |   | 8/1977 | Espy et al. ..................... 214/1 |
| 4,281,961 | A | * | 8/1981 | Redman ...................... 198/379 |
| 5,579,810 | A |   | 12/1996 | Ramsey et al. ................ 140/3 |
| 5,788,051 | A |   | 8/1998 | Knoepfel et al. ........... 198/429 |

FOREIGN PATENT DOCUMENTS

| DE | 2623732 | 12/1976 |
| DE | 3730236 | 3/1989 |
| DE | 19542847 | 5/1997 |
| DE | 19950401 | 6/2000 |
| EP | 0899034 | 3/1999 |
| GB | 1391201 | 4/1975 |
| GB | 2042467 | 9/1980 |
| JP | 3031111 | 2/1991 |
| WO | WO0238304 | 5/2002 |

* cited by examiner

*Primary Examiner*—Lowell A. Larson
(74) *Attorney, Agent, or Firm*—Wood, Herron & Evans, LLP

(57) ABSTRACT

The device for aligning springs (7) on transport from a spring winding machine to a spring interior assembly automatic machine comprises at least one rotary plate pair (17) which rotates about a rotary axle (B) and is drivably mounted about a rotary axle (A). From a take-over location (X) the springs (7) are individually taken over by a gripper hand (5) of a transport star (1) and, slightly pressed together, are inserted between two rotary plates (17). The springs (7) are aligned by the rotary plates (17) so that at the transfer location (Y) they have the desired rotary angle end position and may be inserted by at least one transfer finger (27) between the belt faces (13) of two transport belts (13).

25 Claims, 4 Drawing Sheets

DEVICE FOR ORIENTING SPRINGS

FIELD OF THE INVENTION

The subject-matter of the invention is a device for aligning springs during transport of the springs from a spring winding machine to a spring interior assembly automatic machine.

BACKGROUND OF THE INVENTION

With the known automatic manufacture of spring interior mattresses, springs manufactured on a spring winding machine are taken off by a transport star with several arms, if desired knotted at the ends and additionally subjected to a heat treatment. At the ends of the arms there are arranged gripper hands which remove the springs from the spring winding machine and hold these rigidly during transport. The springs are transferred from the transport star to a transport belt pair and are introduced by this transport belt pair into a spring interior assembly automatic machine. In the spring interior assembly automatic machine the springs are finally connected to one another with spiral wires to be joined together into a spring interior of a predeterminable size. The springs manufactured on the spring winding machine, without additional measures adjusting the springs, reach the transport belt and thus the spring interior assembly automatic machine aligned more or less equally, i.e. the ends of the wires in the region of the end rings lie in each case more or less at the same location. Furthermore, this means that, for example, the last springs of a row are aligned outwardly and thus penetrate through the mattress material. In order to prevent this, usually the last spring is rotated by 180 about its own axis so that the free ends or the two knots of the ends or knots of the last springs are aligned towards the second to last spring. It is, however, often desirable to arrange the springs in pairs with the knots or spring wire ends lying opposite one another. There are already known various devices for this purpose, i.e. the alternate alignment of the knots. From DE-A1 19542847 with a spring led from the rotary star from a spring winding device, it is known within the transport belt to rotate this spring about its own axis with a suitably designed displacer, until the knots have reached the desired angular position. The displacement is effected by a displacing device which is designed in a manner such that one may only roughly achieve the alignment of the knot which is set once. Another desired alignment may only be effected by exchange of the displacer of the displacing device.

The object of the present invention then lies in providing a device for aligning springs or their end knots or generally the end regions to a predeterminable angular position which may be changed at any time.

This object is achieved by a device with the features of the patent claim 1. Advantageous formations are defined in the dependent claims.

SUMMARY OF THE INVENTION

The freely selectable rotational angle end position of the rotary plate during its rotational movement from a take-over location to a transfer location permits the knots and/or ends of the spring wire to be brought into a desired position on the transport belt. Any end positions as a result are possible from spring to spring. With the use of several rotary plates on a rotary disk or likewise which accommodate the rotary plates, the cadence of the aligned springs is considerably increased. Furthermore, by way of the application of several rotary plates their rotational speed on alignment is reduced and thus a sliding of the springs tensioned between the rotary plate pairs on the surfaces of the rotary plates is prevented. In a preferred formation of the invention, when using several rotary plates the later are driven synchronously and without slip by a single toothed belt or chain overdrive. The drive of the toothed belt is effected from the rotational center of the rotary disk. The latter is preferably likewise driven by a servo drive and in steps is led from the take-over position to the transfer position. The introduction of the springs from the transport star or out of their gripper hands into the rotary plate pair and out of the latter is effected in a conventional manner by the linearly driven displacers or by grippers on a pivot axis.

BRIEF DESCRIPTION OF THE DRAWINGS

The invention is described in more detail by way of illustrated embodiment examples.

DETAILED DESCRIPTION OF THE DRAWINGS

Figure 1:
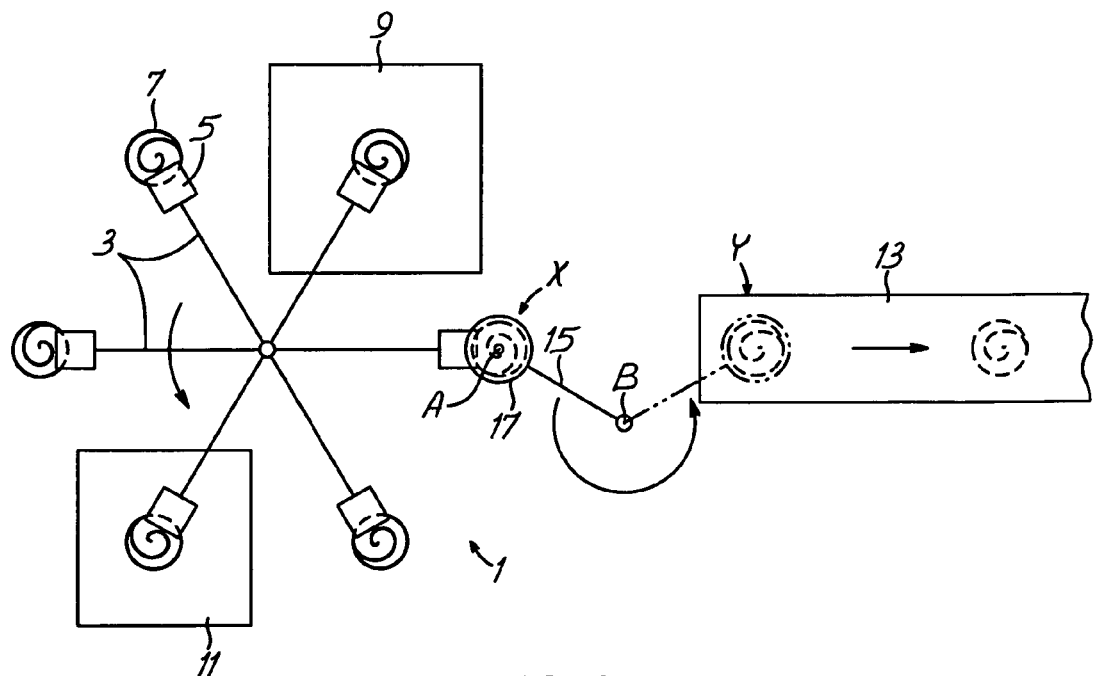
FIG. 1 is a schematic representation of a rotary star and a transport belt with individual rotary plates arranged therebetween mounted on a crank arm.

In FIG. 1 there is schematically shown a rotary star 1 with six gripper arms 3 and mechanically or electrically drivable gripper hands 5 at their ends. With the gripper hands 5, whose design is the state of the art, the springs 7 are gripped and held, these springs having been previously wound on a spring winding device 9. Their ends may be knotted in a knotting device 11. Additionally to the knotting device 11 on the transport path which the springs 7 run through in the gripper hands 5, there may be arranged a heat treatment station (not shown). At a location indicated at X (the take-over location) the springs 7 are removed from the gripper hand 5. At a transfer location Y the springs 7 are transferred to a transport belt pair 13. Between the spring take-over location X and the spring transfer location Y on a rotary axle B there is fastened a crank arm 15 which may be driven by a servo-motor $M_B$. On the distal end of the crank arm 15 there is arranged an axially distanced rotary plate pair 17 which may be driven by a further servo-motor.

Figure 2:
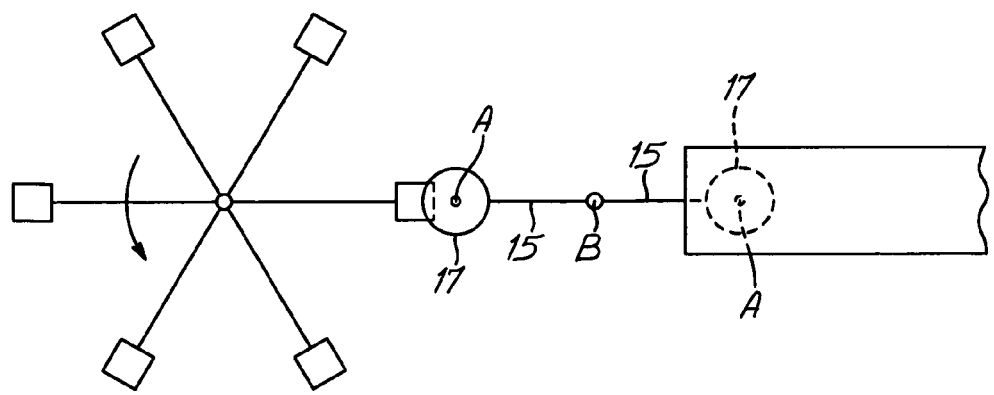
FIG. 2 is a view like FIG. 1, but a device with two rotary plates.

In FIG. 2 the conditions are the same as in FIG. 1, with the exception that on the rotary axle B there are rotatably fastened two crank arms 15 on whose ends there are again arranged two rotary plate pairs 17. The drives of the arm or arms 15 as well as the rotary plates 17 rotatably mounted thereon are described in more detail by way of the particularly favorable formation of the invention with three rotary plate pairs 17 represented in FIG. 5. For the purpose of increasing the cadence, i.e. the springs 7 to be aligned per minute, in this formation of the invention in each case three rotary plates 17 are arranged in each rotary disk 19. The rotary disks 17 in turn are drivably mounted about the rotation center B. The rotary plates 17 rotate in the recesses 29 envisaged for this in the rotary disks 19 about the rotary axes A. The two oppositely lying rotary disks of the rotary disk pairs 19 are drivably mounted on the axle B and their oppositely lying surfaces as well as the surfaces of the rotary plates 17 rotatably mounted in the rotary disks 19 lie in the common plane E. The distance e between the two planes E formed by the rotary disks 19 and rotary plates 17 is smaller than the nominal height of a relieved spring 7. By way of pressing together the spring, at the latest, shortly before insertion of the latter at the take-over location X by the gripper hand 5 between the rotary plates 17 the spring on account of its intrinsic tension force during transport to the transfer location Y is held by way of the friction fit of the end rings with the surface of the rotary plates 17. The compression of the springs 7 at the take-over location X may, for example, be effected between two tapering plates 25. The removal of the springs 7 from the gripper hand 5 and the introduction of the springs 7 between the rotary plates 17 may be effected by a displacer 21 with suitably designed displacing fingers 23. Analogously, insertion transfer fingers 27 are formed at the transfer location Y, which are however individually driven synchronously or are held and mounted on a common plate 28 as with the displacing fingers 23.

Figure 5:
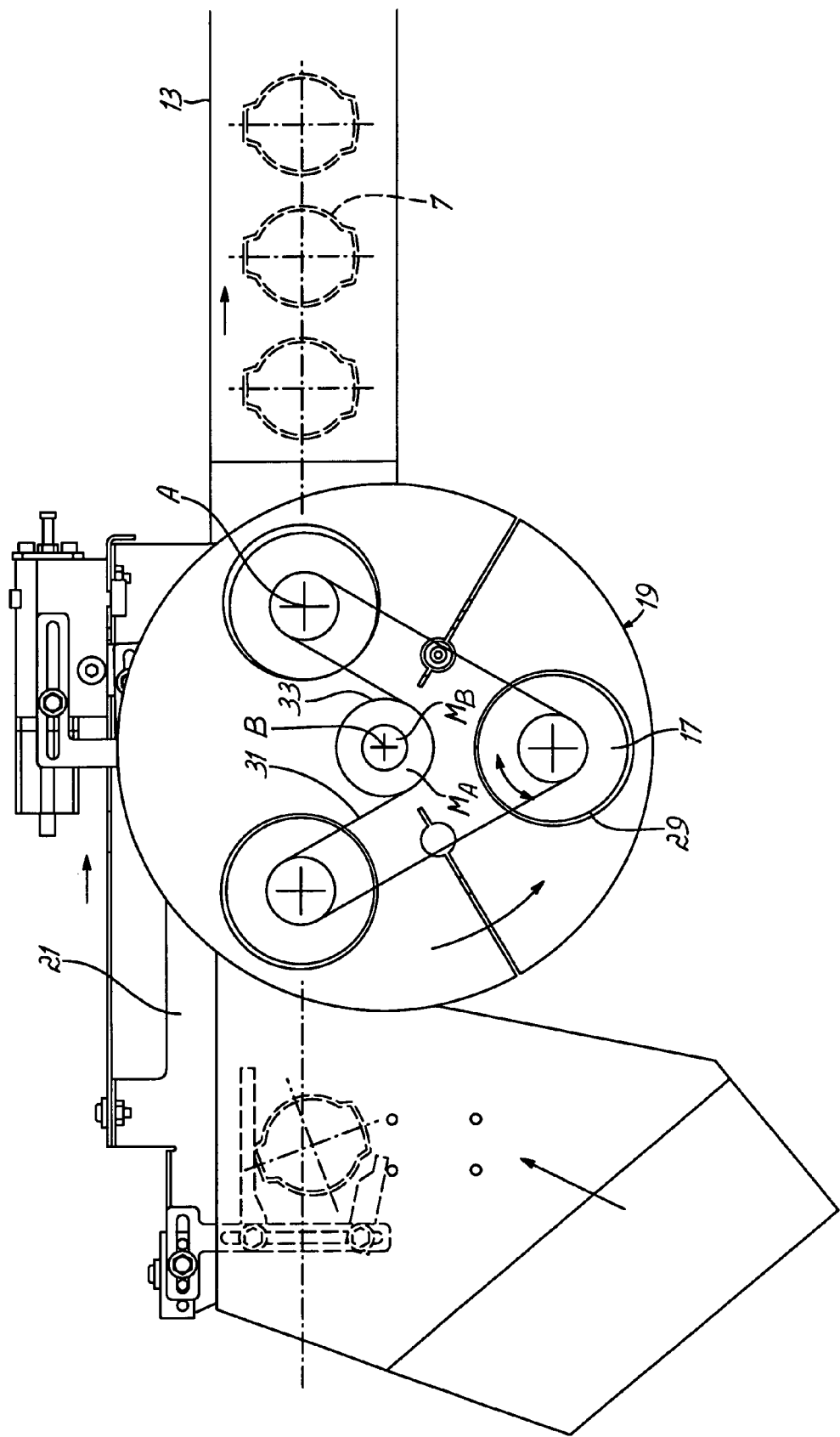
FIG. 5 is a view of the rotary disk with a belt drive of the rotary plates.

The rotary plates 17 rotatably mounted in the tight-tolerance, circular recesses 29 in the two rotary disks 19 are in each case partly embraced by a double-sided toothed belt 31. Furthermore, each of the two toothed belts 31 embraces a drive belt wheel 33 which is seated on the drive axle B of the rotary disk 19 and which may be driven by a servo-motor $M_A$. The rotary disk 19 is likewise drivable by a servo-motor $M_B$, and specifically independently of the drive of the rotary plates 17 (FIG. 5). The two drive shafts for the rotary disks 19 and the drive belt wheels are arranged coaxially.

Figure 3:
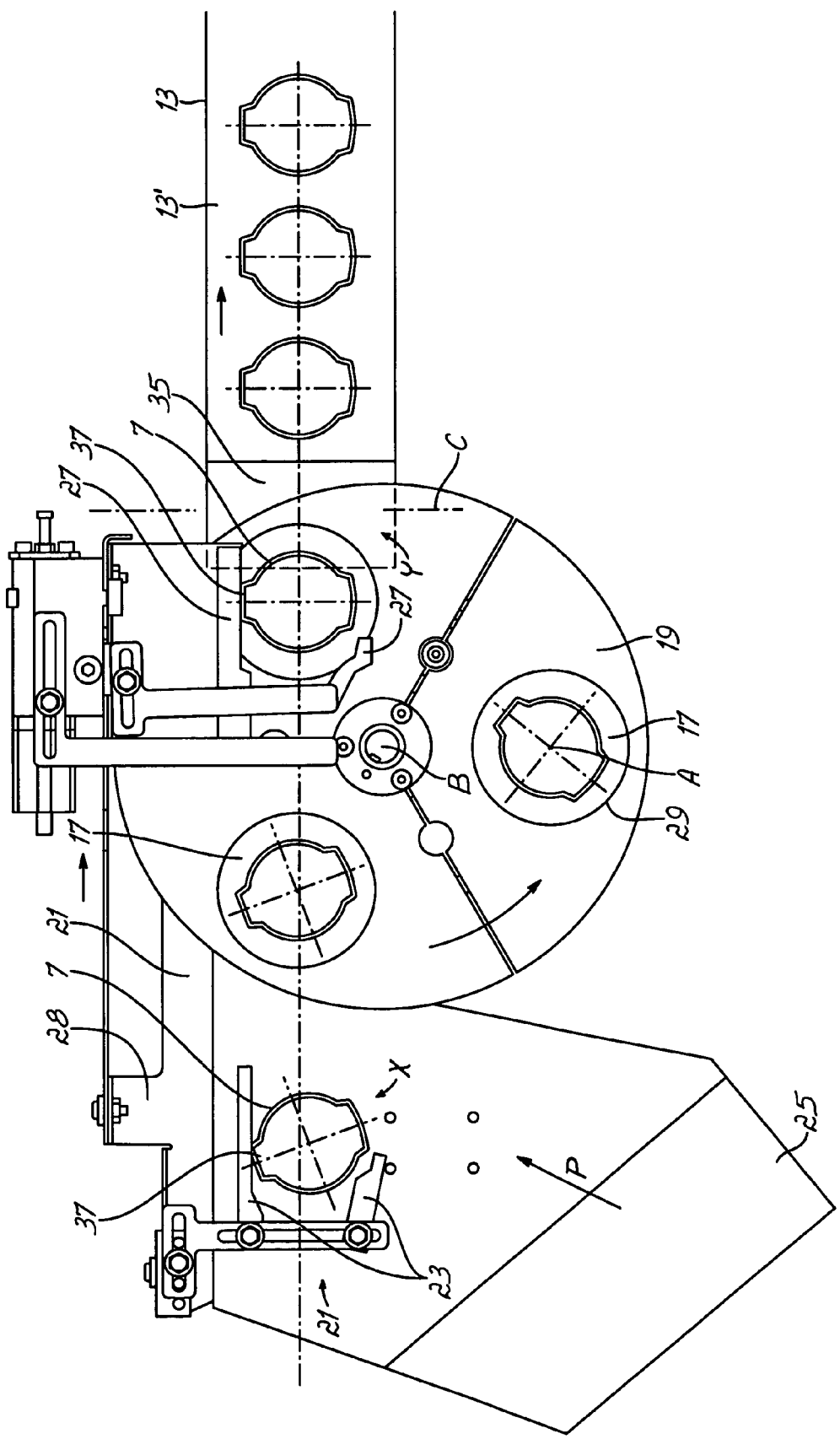
FIG. 3 is a longitudinal section through the rotary disk with three rotary plates as well as the insertion and ejection device.
Figure 4:
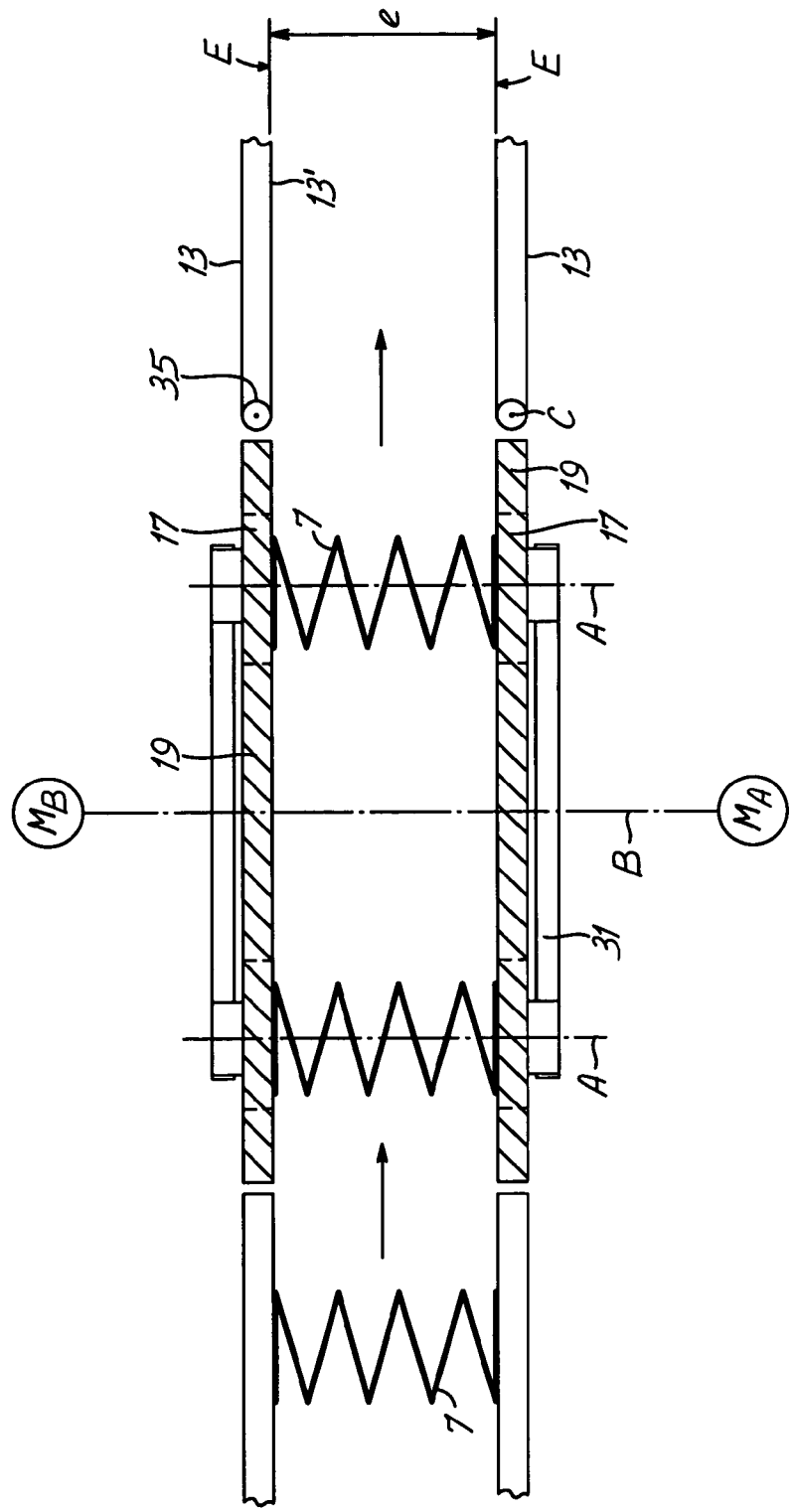
FIG. 4 is a plan view of the rotary disk in FIG. 3.

In the following, the manner of functioning of the device is explained in more detail. With the rotary star 1, individual springs 7 from below (arrow P) held by the gripper hand 5 are introduced between the tensioning and introduction plates 25 and at the same time are pressed axially together. The spring 7 with the displacer 21 or its advance fingers 23 is taken out of the gripper hand 5 (not shown in FIG. 3) and is inserted between the rotary disks 19 arranged opposite one another in pairs, and subsequently the rotary plates 17 arranged therein, and thereupon positioned concentrically to the rotary axle A of the rotary plates 17. Simultaneously, the removal finger 27 displaces a spring 7 located at the spring transfer location Y out of the rotary plate pair 17 which has reached this position, between the inner belt faces 13' lying opposite one another, of the transport belts 13 (right side in FIG. 3). The deflection rollers 35 of the two transport belts 13 are mounted on axes C which lie slightly outside the periphery of the rotary disk 19. After transferring a spring 7 out of the gripper hand 5 into the adjacently lying rotary plate 17 and after the synchronous leading-out of an aligned spring 7 from the rotary plate 17 lying neighboring the transport belt pair there is effected a rotation of the rotary disk 19 by 120° so that the spring 7 which have just been transferred from the gripper hand 5 to the rotary plates 17 is guided downwards and that previously located below now lies opposite the transport belts 13. Now an empty rotary plate pair 17 which has just transferred its spring to the transport belt pair 13 lies adjacent to the subsequent gripper hand 5 with a new spring 7. During the rotational movement of the rotary disk 19 twice by 120° all rotary plates 17 are synchronously guided into the desired rotary angle end position at the transfer location Y since they are connected by the toothed belt 31 and driven by the servo-motor $M_A$. In the illustration according to FIG. 3, the adjacent flat locations 37 at the end rings of the spring 7 lie above and below, wherein alternately the narrower flat location 37 lies above and the wider lies below and vice versa. By way of a suitable activation of the drive servo-motor $M_A$ of the rotary plates 17 the narrow flat location may also be aligned to the left or right according to the set demands within the spring interior automatic machine (not shown).

For an improved overview the knots or wire ends of the end rings have not been shown in the figures, but flat locations of differing widths and their rotational position with respect to the horizontal in the figures.

The invention claimed is:

1. A device for aligning the knots at the end rings of springs with the transport of springs from a spring winding machine to a spring interior assembly automatic machine, said device comprising:
    a transport star having gripper hands for taking the springs at a winding station of the spring winding machine;
    a pair of transport belts for the further transport of aligned springs to the spring interior assembly automatic machine; and
    a transfer apparatus for transferring the springs from the transport star to the transport belts, characterized in that the transfer apparatus comprises at least one drivable pair of spaced rotary plates for rotating one of the springs therebetween.

2. The device of claim 1 wherein the rotary plate pair is drivable by a servo-motor and that a spring held clamped between the rotary plate pair may be transferred to the transport belts at any selectable rotary angle end position.

3. The device of claim 1 wherein the rotary plates are synchronously rotatably mounted in circular recesses in two rotary disks lying opposite one another, and are driven by a drive motor.

4. The device of claim 3 wherein the rotary plates mounted in the rotary disks may be driven by the servo-motor via a common toothed belt.

5. The device of claim 1 wherein the springs are movable by an apparatus out of one of the gripper hands on the rotary star into a position between a rotary plate pair and may be transferred by at least one transfer member out of the rotary plate pair to a position between the two revolving transport belts.

6. The device of claim 1 wherein the springs are axially compressed between the rotary plates.

7. A device for aligning the knots at the end rings of springs with the transport of springs from a spring winding machine to a spring interior assembly automatic machine, said device comprising:
    a transport star having several gripper arms for moving springs between select locations, each of said gripper arms having a gripper hand for holding a spring;
    one of said select locations being a take-over location for removing a spring from a gripper hand;
    a pair of transport belts for the further transport of aligned springs to the assembly automatic machine; and
    a transfer apparatus for transferring the springs from the transport star to the transport belts, characterized in that the transfer apparatus comprises at least one drivable pair of spaced rotary plates synchronously driven to selectively orient the knots of the spring therebetween.

8. A device for aligning the knots at the end rings of springs with the transport of springs from a spring winding machine to a spring interior assembly automatic machine, said device comprising:
    a transport star having several gripper arms for moving springs between select locations, each of said gripper arms having a gripper hand for holding a spring;

one of said select locations being a take-over location for removing a spring from a gripper hand; and a transfer apparatus for transferring the spring from one of the gripper hands of the transport star to a position between a pair of rotary plates for changing the orientation of the spring; and an apparatus for moving the spring between the rotary plates to a position between a pair of transport belts for the further transport of aligned springs to the assembly automatic machine.

9. The device of claim 8 further comprising means for rotating the rotary plates to change the orientation of the spring.

10. The device of claim 8 further comprising a heat treating station at one of said select locations.

11. The device of claim 8 further comprising a knotting device at one of said select locations.

12. The device of claim 8 further comprising a pair of synchronously driven rotary disks having a common axis and driven by a servo-motor, the rotary plates being mounted in the rotary disks.

13. A device for aligning the knots at the end rings of springs with the transport of springs from a spring winding machine to a spring interior assembly automatic machine, said device comprising:

a transport star having several gripper arms for moving springs between select locations, each of said gripper arms having a gripper hand for holding a spring;

a transfer apparatus for transferring the spring from one of the gripper hands of the transport star to a position between a pair of synchronously driven rotary plates for changing the orientation of the spring; and an apparatus for moving the spring between the rotary plates to a position between a pair of transport belts for further transport of the spring to the assembly automatic machine.

14. A device for aligning the knots at the end rings of springs with the transport of springs from a spring winding machine to a spring interior assembly automatic machine, said device comprising:

a transport star having several gripper arms for moving springs between select locations, each of said gripper arms having a gripper hand for holding a spring;

a pair of spaced-apart transport members, each of the transport members having at least one recess therein;

rotary disks rotatably mounted in the recesses of the transport members for changing the orientation of a spring compressed therebetween; and an apparatus for removing the spring compressed between the rotary disks to a position between a pair of transport belts for further transport of the spring to the assembly automatic machine.

15. The device of claim 14 wherein the transport members rotate about an axis.

16. The device of claim 14 wherein each of the transport members has three recesses.

17. A method of transporting springs from a spring winding machine to a spring interior assembly automatic machine, said method comprising:

providing a transport star having gripper hands;

taking one of the springs at a winding station of the spring winding machine with one of the gripper hands;

transferring the spring from the gripper hand of the transport star to a position between a pair of spaced rotary plates;

rotating the spaced rotary plates to rotate the spring therebetween to position the knots at the end rings of springs in a desired position;

transporting the spring to a position between a pair of transport belts; and transporting the spring to the spring interior assembly automatic machine.

18. The method of claim 17 wherein the spaced rotary plates are driven synchronously.

19. The method of claim 18 wherein the spaced rotary plates are driven by a belt.

20. The method of claim 17 wherein the spaced rotary plates are driven by a servo-motor.

21. A method of transporting springs from a spring winding machine to a spring interior assembly automatic machine, said method comprising:

providing a transport star having gripper hands;

taking one of the springs at a winding station of the spring winding machine with one of the gripper hands;

removing the spring from the gripper hand of the transport star at a take-over location;

transferring the spring to a spring transfer position between a pair of transport belts using at least one crank arm, said crank arm having a pair of spaced rotary plates;

rotating the spaced rotary plates to rotate the spring therebetween to position knots at the end rings of springs in a desired position; and transporting the spring to the spring interior assembly automatic machine.

22. The method of claim 21 wherein the spaced rotary plates are driven synchronously.

23. The method of claim 21 wherein the spaced rotary plates are driven by a belt.

24. The method of claim 21 wherein the spaced rotary plates are driven by a servo-motor.

25. A method of transporting springs from a spring winding machine to a spring interior assembly automatic machine, said method comprising:

providing a transport star having gripper hands;

taking one of the springs at a winding station of the spring winding machine with one of the gripper hands;

removing the spring from the gripper hand of the transport star at a take-over location;

transferring the spring to a spring transfer position having a pair of spaced rotary plates;

rotating the spaced rotary plates to rotate the spring therebetween to position knots at the end rings of springs in a desired position; and further transporting the spring to the spring interior assembly automatic machine.

* * * * *